United States Patent
Park et al.

(10) Patent No.: US 12,277,694 B2
(45) Date of Patent: Apr. 15, 2025

(54) METHOD OF DETECTING DEFECT AND SYSTEM OF DETECTING DEFECT

(71) Applicant: Samsung Display Co., Ltd., Yongin-Si (KR)

(72) Inventors: Younggil Park, Asan-si (KR); Kihyun Kim, Hwaseong-si (KR); Younguook Lee, Cheonan-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 645 days.

(21) Appl. No.: 17/325,396

(22) Filed: May 20, 2021

(65) Prior Publication Data
US 2022/0067910 A1    Mar. 3, 2022

(30) Foreign Application Priority Data
Aug. 27, 2020  (KR) .................. 10-2020-0108417

(51) Int. Cl.
*G06T 7/00*        (2017.01)
*G06N 3/04*        (2023.01)
*G06N 3/08*        (2023.01)
*G06T 7/70*        (2017.01)

(52) U.S. Cl.
CPC ............ *G06T 7/0004* (2013.01); *G06N 3/04* (2013.01); *G06N 3/08* (2013.01); *G06T 7/70* (2017.01); *G06T 2207/10061* (2013.01); *G06T 2207/10116* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 10,901,402 B2 * | 1/2021 | Greenberg | G05B 19/41875 |
| 2015/0138564 A1 * | 5/2015 | Jung | G01N 21/95 356/479 |
| 2016/0364849 A1 * | 12/2016 | Liu | G06T 7/0004 |
| 2021/0209488 A1 * | 7/2021 | Li | G06N 3/063 |

FOREIGN PATENT DOCUMENTS

| | | | |
|---|---|---|---|
| KR | 101906456 B1 | 12/2018 | |
| KR | 101995107 B1 | 7/2019 | |

OTHER PUBLICATIONS

Tang et al ("Nondestructive Defect Detection in Castings by Using Spatial Attention Bilinear Convolutional Neural Network", IEEE Transactions on Industrial Informatics, vol. 17, Issue: 1, Published Apr. 6, 2020, pp. 82-89, DOI: 10.1109/TII.2020.2985159, retrieved from the Internet on Oct. 6, 2023) (Year: 2020).*

* cited by examiner

*Primary Examiner* — Leon Viet Q Nguyen
(74) *Attorney, Agent, or Firm* — CANTOR COLBURN LLP

(57) ABSTRACT

A method of detecting a defect in a stacked structure of a display panel includes collecting a first image of the defect and a plurality of layers in the stacked structure from a database, learning a defect information of the defect and a layer information of the layers using a deep learning model based on the first image and detecting a location of the defect among the layers by the defect information and the layer information.

14 Claims, 6 Drawing Sheets

METHOD OF DETECTING DEFECT AND SYSTEM OF DETECTING DEFECT

This application claims priority to Korean Patent Application No. 10-2020-0108417 filed on Aug. 27, 2020, and all the benefits accruing therefrom under 35 U.S.C. § 119, the content of which in its entirety is herein incorporated by reference.

BACKGROUND

1. Field

Embodiments relate to a method of detecting a defect. More particularly, embodiments relate to a method and a system of detecting a defect in which a transmission electron microscope ("TEM") image, a scanning electron microscope ("SEM") image, a scanning transmission electron microscope ("STEM") image, a secondary ion microscope ("SIM") image and an energy dispersive X-ray spectroscopy ("EDS") elemental mapping image may be learned using a deep learning and then detailed location information of the defect may be detected by combining them.

2. Description of the Related Art

It is possible to detect which layer of a stacked structure of a display panel has a defect using a transmission electron microscope ("TEM") image, a scanning electron microscope ("SEM") image, a scanning transmission electron microscope ("STEM") image, a secondary ion microscope ("SIM") image and an energy dispersive spectroscopy ("EDS") analysis mapping in a process of manufacturing display devices.

SUMMARY

A determination of a location of a defect may be performed by engineers, so that data information may be lost and a determination time may increase.

In addition, a conventional object detection technology using an artificial intelligence deep learning has a limitation in that it only checks a type of an object and a simple location information in a single image.

Embodiments provide a method and a system for detecting a defect in a stacked structure of a display panel capable of automatically determining the detection of the defect in the stacked structure of the display panel using a deep learning to prevent human and cost loss.

Embodiments provide a method and a system for detecting a defect capable of preventing data loss and improving database utilization possibility by enabling statistical analysis of image data through a database.

A method of detecting a defect in a stacked structure of a display panel in an embodiment may include collecting a first image of the defect and a plurality of layers in the stacked structure from a database, learning a defect information of the defect and a layer information of the plurality of layers using a deep learning model based on the first image and detecting a location of the defect among the plurality of layers by the defect information and the layer information.

In an embodiment, the first image may be one of a transmission electron microscope ("TEM") image, a scanning electron microscope ("SEM") image, a scanning transmission electron microscope ("STEM") image and a secondary ion microscope ("SIM") image.

In an embodiment, the first image may be an energy dispersive X-ray spectroscopy ("EDS") elemental mapping image.

In an embodiment, the defect information and the layer information may include a component information of the defect and a component information of the plurality of layers, respectively.

In an embodiment, the deep learning model may include a CNN.

In an embodiment, the deep learning model may include a plurality of convolution layers and an attention module.

In an embodiment, A method of detecting a defect in a stacked structure of a display panel may include a collecting a first image of the defect and a plurality of layers in the stacked structure from a database, a learning a first defect information of the defect and a first layer information of the plurality of layers using a deep learning model based on the first image, a extracting a first location information of the defect by the first defect information and the first layer information, a collecting a second image of the defect and the plurality of layers in the stacked structure from a database, a learning a second defect information of the defect and a second layer information of the plurality of layers using the deep learning model based on the second image, a extracting a component information of the defect and first component information of the plurality of layers using the second defect information and the second layer information, a learning a second location information of the defect and a second component information of the plurality of layers using the deep learning model based on the first location information of the defect, the component information of the defect and the first component information of the plurality of layers and a detecting a location of the defect among the layers by the second location information of the defect and the second component information of the layers.

In an embodiment, the deep learning model may include a CNN.

In an embodiment, the deep learning model may include a plurality of convolution layers and an attention module.

In an embodiment, the deep learning model may include an average pooling.

A system of detecting a defect in a stacked structure of a display panel in an embodiment may include a collection unit which collects a first image of the defect and a plurality of layers in the stacked structure from a database, a learning unit which learns a defect information of the defect and a layer information of the plurality of layers using a deep learning model based on the first image and a detection unit which detects a location of the defect among the plurality of layers using the defect information and the layer information.

In an embodiment, the first image may be one of a TEM image, a SEM image, a STEM image and a SIM image.

In an embodiment, the first image may be an EDS elemental mapping image.

In an embodiment, the deep learning model may include a CNN.

In an embodiment, the deep learning model may include a plurality of convolution layers and an attention module.

In the system of detecting a defect in a stacked structure of a display panel in an embodiment, by learning a first image of a defect and a plurality of layers, it is possible to detect the location of the defect while minimizing human and cost loss.

In addition, it is possible to statistically analyze image data through a database, so that process abnormalities may be prevented in advance when manufacturing a stacked structure of a display panel.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
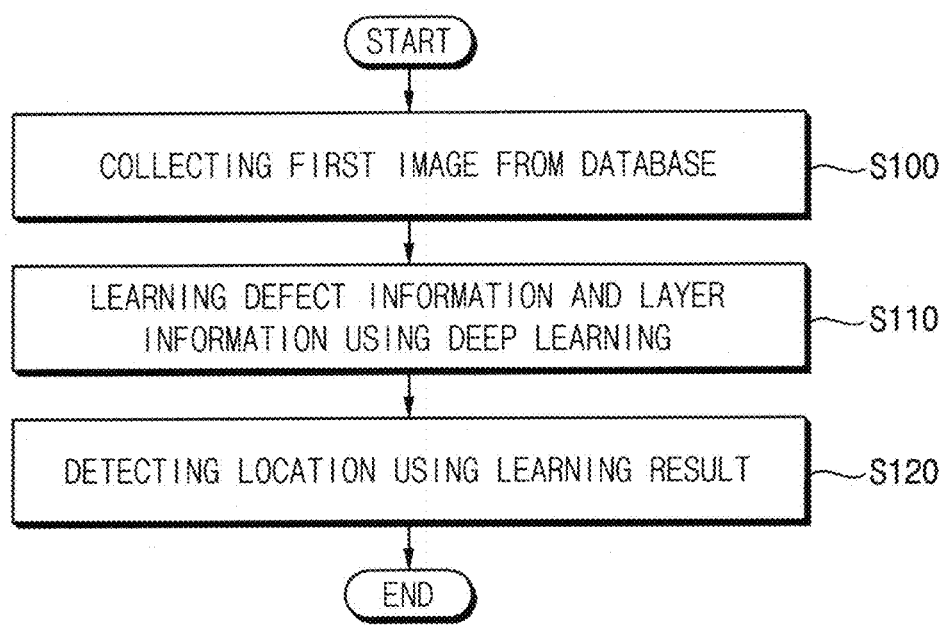
FIG. 1 is a flowchart illustrating an embodiment of a method of detecting a defect in a stacked structure of a display panel using a deep learning.

Hereinafter, embodiments will be described in detail with reference to the accompanying drawings so that those of ordinary skill in the art may easily implement the invention. However, the invention may be implemented in various different forms, and is not limited to the embodiments described herein. In the drawings, parts irrelevant to the description are omitted in order to clearly describe the invention, and similar reference numerals are assigned to similar parts throughout the specification.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

The terms used in the specification will be briefly described, and the invention will be described in detail.

When a part of the specification is said to "include" a predetermined component, it means that other components may be further included rather than excluding other components unless specifically stated to the contrary. In addition, terms such as "unit" and "module" described in the specification mean a unit that processes at least one function or operation and which may be implemented as hardware (e.g., a circuit or a processor) or software or a combination of hardware and software.

Hereinafter, methods and systems of detecting a defect in embodiments will be explained in detail with reference to the accompanying drawings.

FIG. 1 is a flowchart illustrating a method of detecting a defect in a stacked structure of a display panel using a deep learning.

Referring to FIG. 1, a method of detecting a defect in a stacked structure of a display panel in an embodiment may include collecting a first image of the defect and a plurality of layers in the stacked structure from a database (operation S100), learning a defect information of the defect and a layer information of the layers using a deep learning model based on the first image (operation S110) and detecting a location of the defect among the layers by the defect information and the layer information (operation S120).

Figure 2:
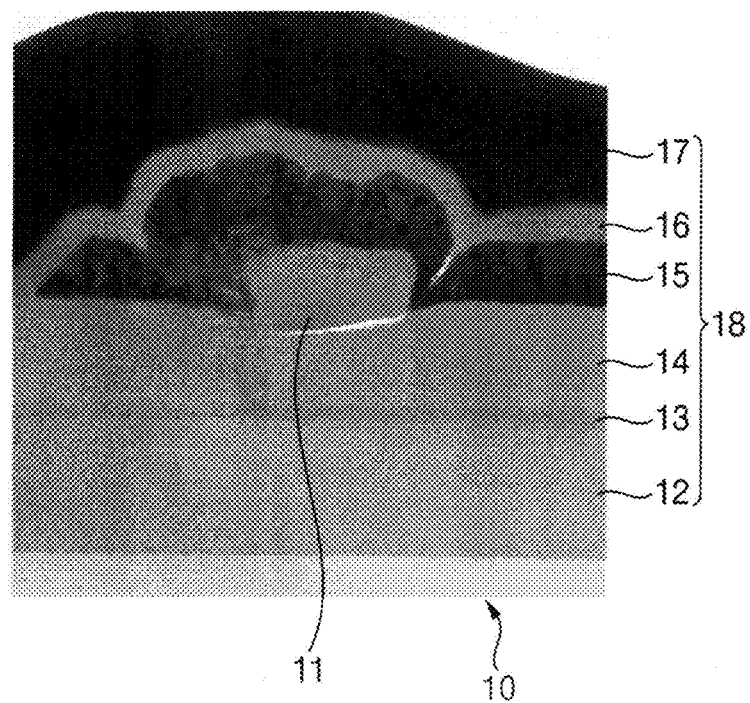
FIG. 2 is a diagram illustrating an image displaying a defect information of a defect and a layer information of layers using a transmission electron microscope ("TEM").

FIG. 2 is a diagram illustrating an image displaying a defect information of a defect and a layer information of the layers using a transmission electron microscope ("TEM").

Figure 3:
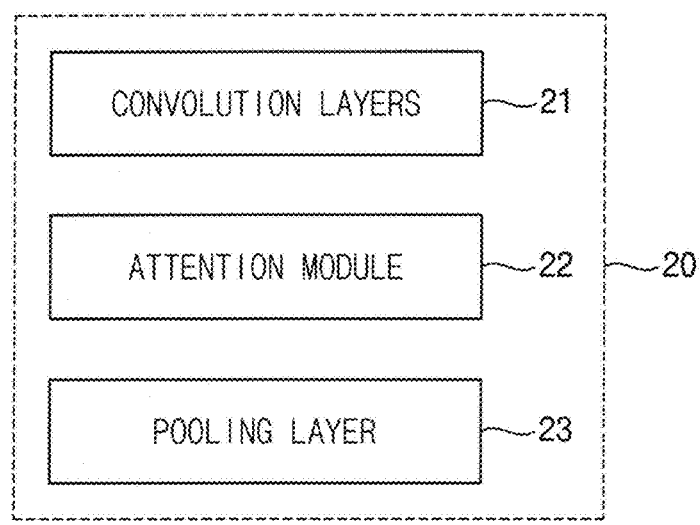
FIG. 3 is a block diagram illustrating a convolutional neural network for learning the defect information and the layer information.

FIG. 3 is a block diagram illustrating a convolutional neural network for learning the defect information and the layer information.

Referring to FIGS. 1, 2 and 3, in an embodiment, the first image 10 may include the defect information of the defect 11 and the layer information on the layers 18. The layers 18 may include a barrier layer 12, a first buffer layer 13, a second buffer layer 14, a gate layer 15, a gate insulating layer 16 and a data layer 17 that are sequentially stacked. The defect 11 may be disposed between two of the layers 18.

In an embodiment, the first image 10 may be one of a TEM image, a scanning electron microscope ("SEM") image, a scanning transmission electron microscope ("STEM") image and a secondary ion microscope ("SIM") image. The type of the first image 10 is not limited thereto, and any image may be the first image 10 when that image includes the defect information of the defect 11 and the layer information of the layers 18.

FIG. 2 illustrates that the number of the layers 18 of the first image 10 is six, however, the embodiments are not limited thereto, and the first image 10 may also include two to five or seven or more layers.

In an embodiment, the learning of the defect information of the defect and the layer information of the layers (operation S110) may be performed by detecting the defect using a convolutional neural network ("CNN") 20. Specifically, in the learning operation S110, the first image 10 may be input in order to learn the location information of the defect.

The CNN 20 is the deep neural network ("DNN"), which is an artificial neural network that includes multiple hidden layers between an input layer and an output layer, and may include at least one convolution layer 21.

The CNN 20 may be used to extract "features" such as a location of the defect, components of a layer, etc. from the first image 10, and may include a plurality of layers. Each of the layers may receive input data and process the input data to generate output data.

The CNN 20 may output a feature map generated by convolution of the inputted first image 10 as the output data.

The CNN 20 may further include a pooling layer 23 in which a pooling operation is performed in addition to the at least one convolution layer 21 in which a convolution operation is performed. A pooling technique may be a technique used to reduce the spatial size of data in the pooling layer 23. Specifically, the pooling technique may include a max pooling technique for selecting a maximum value in a corresponding domain and an average pooling technique for selecting an average value in a corresponding domain.

The CNN 20 may further include an attention module 22 in addition to the at least one convolution layer 21 and the pooling layer 23. The attention module 22 may be a module used to enlarge a value of important data from the extracted features. Specifically, the attention module 22 may include a bottleneck attention module ("BAM") and a convolutional block attention module ("CBAM"). The attention module 22 may be disposed at the end of the at least one convolution layer 21 to perform learning.

In the operation S100 of collecting the first image 10, image data standards may be established to increase a success rate. In an embodiment, image data standards such as an image magnification, an extension format, a display color for each component, etc., for example, may be established.

In an embodiment, in the CNN 20, a convolutional architecture MobileNetV2 may be used as a backbone to extract features from an input image.

In an embodiment, the operation of detecting a location of the defect 11 among the layers 18 using the defect information and the layer information (operation S120) may detect in which of the layers 18 the defect 11 is located using extracted features. FIG. 2 illustrates that the defect 11 is located on the gate layer 15 among the layers 18. However, the invention is not limited thereto, and the location of the defect 11 may be detected when the defect 11 is located on other layers 12, 13, 14, 16 and 17.

Figure 4A:
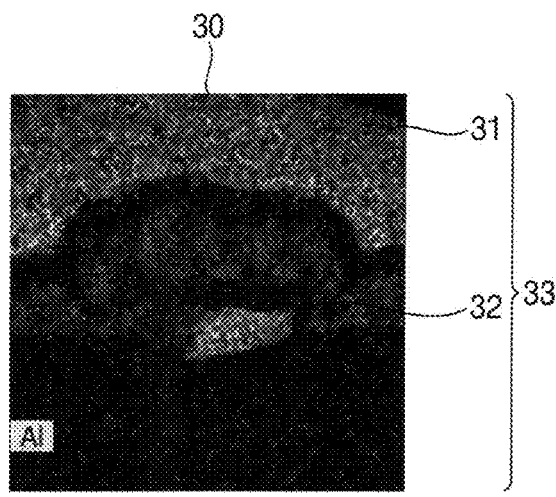
FIG. 4A, FIG. 4B and FIG. 4C are diagrams illustrating an energy dispersive X-ray spectroscopy ("EDS") elemental mapping image displaying the defect information of the defect and the layer information of the layers.
Figure 4B:
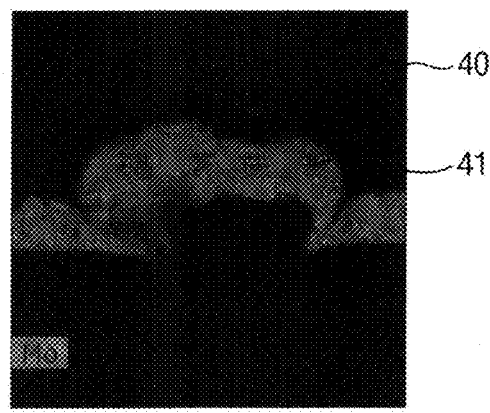
Figure 4C:
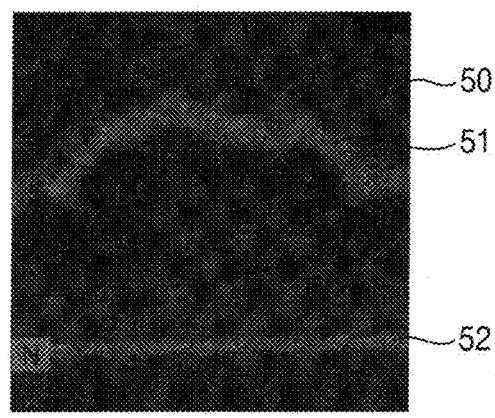

FIGS. 4A, 4B and 4C are diagrams illustrating an energy dispersive X-ray spectroscopy ("EDS") elemental mapping image displaying the defect information of the defect and the layer information of the layers.

Referring to FIGS. 4A, 4B and 4C, the first image 30 may be an EDS analysis mapping image. The energy dispersive spectrometer may be an equipment that is attached to any one of a TEM, a SEM and a STEM. It may be a device that performs qualitative and quantitative analysis. That is, a TEM, a SEM, and a STEM may form an image of a test sample, and the energy dispersive spectroscopic may analyze components of the test sample. Referring back to FIG. 4A, since the first image 30 may include an aluminum (Al) component in the defect 32 and the data layer 31, the first image 30 may exhibit yellow color. Referring back to FIG. 4B, since the first image 40 may include a molybdenum (Mo) component in the gate layer 41, the first image 40 may exhibit green color. Referring back to FIG. 4C, since the first image 50 may include a nitrogen (N) component in the first buffer layer 52 and the gate insulating layer 51, the first image 50 may exhibit red color.

Referring to FIGS. 1, 3, 4A, 4B and 4C, in an embodiment, at least one of the first images 30, 40, and 50 may include a component information of the defect 32 and a component information of the layers 33. The component information of the defect and the component information of the layers may exhibit a predetermined color.

Figure 5:
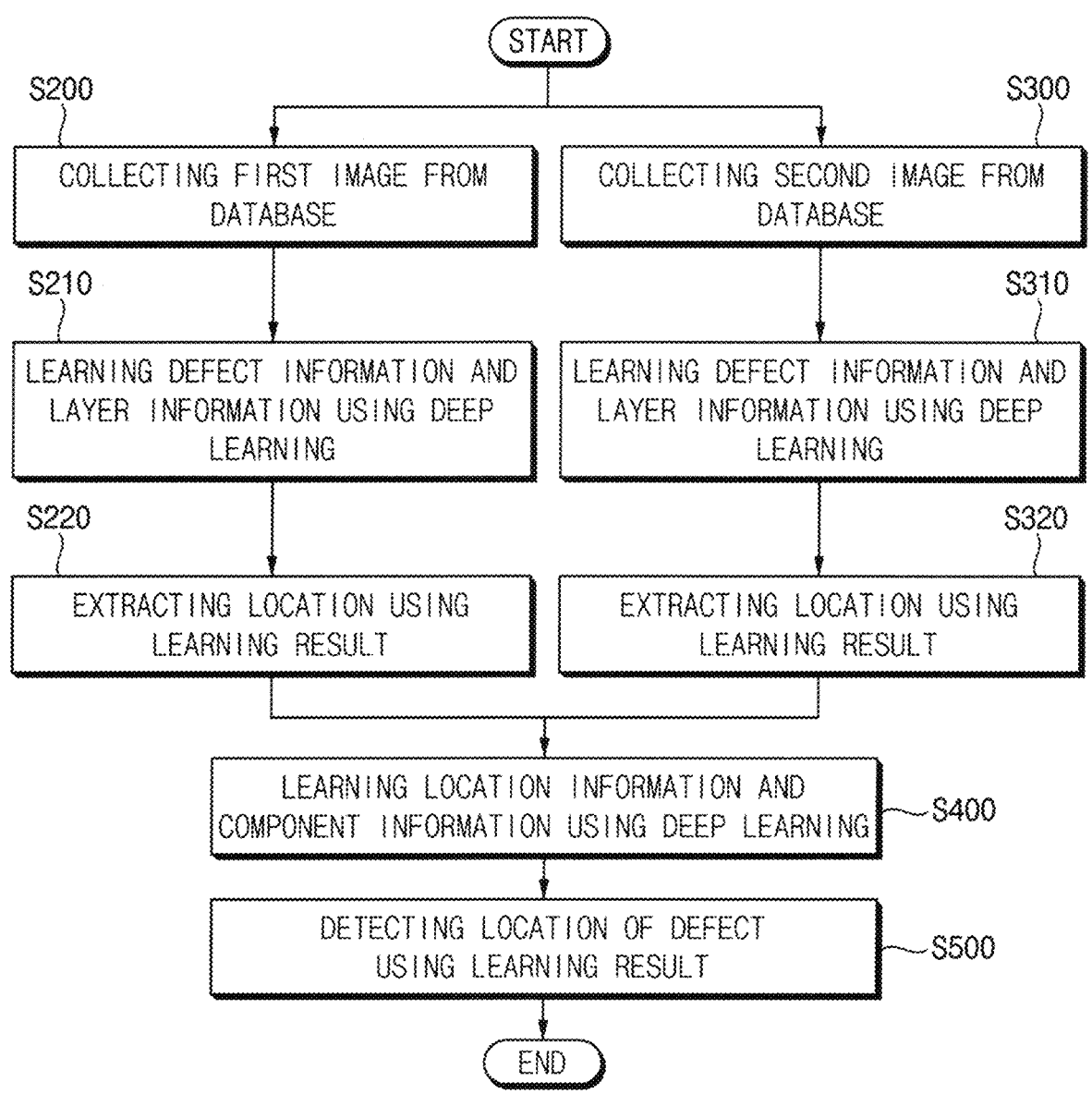
FIG. 5 is a flowchart illustrating an embodiment of a method of detecting a defect in a stacked structure of a display panel using a deep learning.

FIG. 5 is a flowchart illustrating a method of detecting a defect in a stacked structure of a display panel using a deep learning.

Referring to FIG. 5, a method of detecting a defect in a stacked structure of a display panel in an embodiment may include collecting a first image of the defect and a plurality of layers in the stacked structure from a database (operation S200), learning a first defect information of the defect and a first layer information of the layers using a deep learning model based on the first image (operation S210), extracting a first location information of the defect by the first defect information and the first layer information (operation S220), collecting a second image of the defect and the plurality of layers in the stacked structure from a database (operation S300), learning a second defect information of the defect and a second layer information of the layers using the deep learning model based on the second image (operation S310), extracting a component information of the defect and first component information of the layers using the second defect information and the second layer information (operation S320), learning a second location information of the defect and a second component information of the layers using the deep learning model based on the first location information of the defect, the component information of the defect and the first component information of the layers (operation S400) and detecting a location of the defect among the layers by the second location information of the defect and the second component information of the layers (operation S500).

Referring to FIGS. 1, 2, 3, 4A, 4B, 4C and 5, in an embodiment, the first image 10 may be one of a TEM image, a SEM image, a STEM image and a SIM image. The second image 30, 40, 50 may be the EDS elemental mapping image.

In an embodiment, collecting a first image of the defect and a plurality of layers in the stacked structure from a database (operation S200), learning a first defect information of the defect and a first layer information of the layers using a deep learning model based on the first image (operation S210), extracting a first location information of the defect by the first defect information and the first layer information (operation S220), collecting a second image of the defect and the plurality of layers in the stacked structure from a database (operation S300), learning a second defect information of the defect and a second layer information of the layers using the deep learning model based on the second image (operation S310) and extracting a component information of the defect and first component information of the layers using the second defect information and the second layer information (operation S320) may be omitted since it is the same as or similar to collecting a first image of the defect and a plurality of layers in the stacked structure from a database (operation S100), learning a defect information of the defect and a layer information of the layers using a deep learning model based on the first image (operation S110) and detecting a location of the defect among the layers by the defect information and the layer information (operation S120).

In an embodiment, the operation of learning the location information of the defect about and the component information of the layers (operation S400) may be performed by detecting the defect using the CNN. Specifically, in the learning operation S400, the first location information and the component information of the defect and the first component information of the layers may be input in order to learn the location information of the defect and the component information of the layers.

The CNN 20 is the DNN, which is an artificial neural network that includes multiple hidden layers between an input layer and an output layer, and may include at least one convolution layer 21.

The CNN 20 may be used to extract "features" such as a location of the defect, components of the layer, etc., from the first location information, the component information of the defect and the first component information of the layers and may include a plurality of layers. Each of the layers may receive input data and process the input data of the layer to generate output data. The CNN 20 may output a feature map generated by convolution of the inputted first location information, the component information of the defect and the first component information as the output data.

The CNN 20 may further include a pooling layer 23 on which a pooling operation is performed in addition to the at least one convolution layer 21 in which a convolution operation is performed. A pooling technique may be a technique used to reduce the spatial size of data in the pooling layer 23. Specifically, the pooling technique may include a max pooling technique for selecting a maximum value in a corresponding domain and an average pooling technique for selecting an average value in a corresponding domain.

The CNN 20 may further include an attention module 22 in addition to the at least one convolution layer 21 and the pooling layer 23. The attention module 22 may be a module used to enlarge a value of important data from the extracted features. Specifically, the attention module 22 may include the BAM and the CBAM. The attention module 22 may be disposed at the end of the at least one convolution layer 21 to perform learning.

In the operation S200 of collecting the first image 10 and the second image 30, 40, 50, image data standards may be established to increase a success rate. In an embodiment, image data standards such as an image magnification, an extension format and a display color for each component, etc. may be established, for example.

In an embodiment, in the CNN 20, a convolutional architecture MobileNetV2 may be used as a backbone to extract features from an input image.

In an embodiment, the operation S500 of detecting the location of the defect among the layers using the second location information of the defect and the second component information of the layers 18 may detect which of the layers 18 the defect 11 is disposed in using the extracted features. FIG. 2 illustrates that a state in which the defect 11 is disposed on the gate layer 15 among the layers 18. Embodiments of the invention is not limited thereto, and the location of the defect 11 may be detected even when the defect 11 is disposed on the other layers 12, 13, 14, 16 and 17.

A system 1000 of detecting a defect in a stacked structure of a display panel in an embodiment may be provided. In relation to the system 1000 to be described below, the above described method may be applied. Accordingly, descriptions of the same contents as those described above in relation to the system may be omitted.

Figure 6:
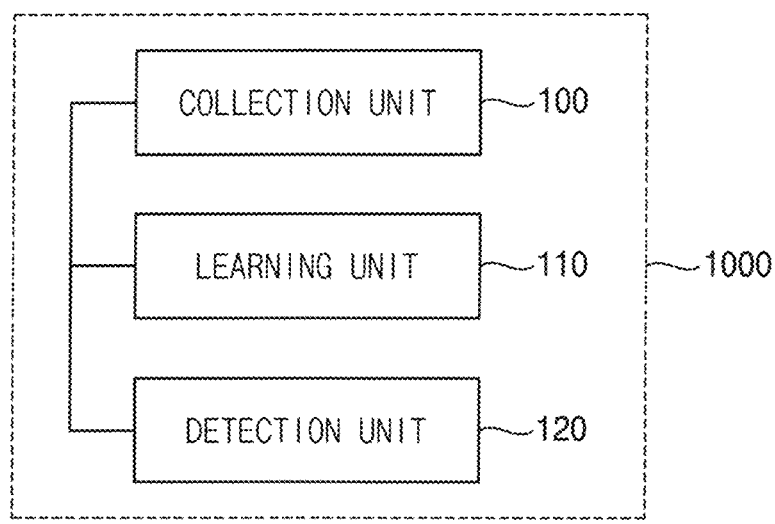
FIG. 6 is a block diagram illustrating an embodiment of a system of detecting a defect.

FIG. 6 is a block diagram illustrating a system of detecting a defect.

Referring to FIG. 6, the system 1000 in an embodiment may include a collection unit 100 which collects a first image of the defect and a plurality of layers in the stacked structure from a database 100, a learning unit 110 which learns a defect information of the defect and a layer information of the layers using a deep learning model based on the first image and a detection unit 120 which detects a location of the defect among the layers using the defect information and the layer information.

The method and the system in the embodiments may be applied to a display device included in a computer, a notebook, a mobile phone, a smartphone, a smart pad, a portable media player ("PMP"), a personal digital assistance ("PDA"), an MP3 player, or the like.

Although the methods and the systems in the embodiments have been described with reference to the drawings, the illustrated embodiments are examples, and may be modified and changed by a person having ordinary knowledge in the relevant technical field without departing from the technical spirit described in the following claims.

What is claimed is:

1. A method of detecting a defect in a stacked structure of a display panel, the method comprising:
    collecting a first image of the defect and a plurality of layers in the stacked structure in a cross-section from a database;
    learning a defect information of the defect and a layer information of the plurality of layers using a deep learning model based on the first image; and
    detecting a location of the defect among the plurality of layers by the defect information and the layer information,
    wherein the defect information includes a component information of the defect,
    the layer information includes a component information of the plurality of layers, and
    the component information of the defect and the component information of the plurality of layers each exhibit a predetermined color.

2. The method of claim 1, wherein the first image is one of a transmission electron microscope image, a scanning electron microscope image, a scanning transmission electron microscope image and a secondary ion microscope image.

3. The method of claim 1, wherein the first image is an energy dispersive X-ray spectroscopy elemental mapping image.

4. The method of claim 1, wherein the deep learning model includes a convolutional neural network.

5. The method of claim 1, wherein the deep learning model includes a plurality of convolution layers and an attention module.

6. A method of detecting a defect in a stacked structure of a display panel, the method comprising:
    collecting a first image of the defect and a plurality of layers in the stacked structure from a database;

learning a first defect information of the defect and a first layer information of the plurality of layers using a deep learning model based on the first image;

extracting a first location information of the defect by the first defect information and the first layer information;

collecting a second image of the defect and the plurality of layers in the stacked structure from a database;

learning a second defect information of the defect and a second layer information of the plurality of layers using the deep learning model based on the second image;

extracting a component information of the defect and first component information of the plurality of layers using the second defect information and the second layer information;

learning a second location information of the defect and a second component information of the plurality of layers using the deep learning model based on the first location information of the defect, the component information of the defect and the first component information of the plurality of layers; and detecting a location of the defect among the plurality of layers by the second location information of the defect and the second component information of the plurality of layers.

7. The method of claim 6, wherein the deep learning model includes a convolutional neural network.

8. The method of claim 6, wherein the deep learning model includes a plurality of convolution layers and an attention module.

9. The method of claim 6, wherein the deep learning model includes an average pooling.

10. A system of detecting a defect in a stacked structure of a display panel, the system comprising;

a collection unit which collects a first image of the defect and a plurality of layers in the stacked structure in a cross-section from a database;

a learning unit which learns a defect information of the defect and a layer information of the plurality of layers using a deep learning model based on the first image; and a detection unit which detects a location of the defect among the plurality of layers using the defect information and the layer information, wherein the defect information includes a component information of the defect, the layer information includes a component information of the plurality of layers, and the component information of the defect and the component information of the plurality of layers each exhibit a predetermined color.

11. The system of claim 10, wherein the first image is one of a transmission electron microscope image, a scanning electron microscope image, a scanning transmission electron microscope image and a secondary ion microscope image.

12. The system of claim 10, wherein the first image is an energy dispersive X-ray spectroscopy elemental mapping image.

13. The system of claim 10, wherein the deep learning model includes a convolutional neural network.

14. The system of claim 10, wherein the deep learning model includes a plurality of convolution layers and an attention module.

* * * * *